US007925061B2

(12) United States Patent
Izawa

(10) Patent No.: US 7,925,061 B2
(45) Date of Patent: Apr. 12, 2011

(54) PERSON IMAGING APPARATUS, METHOD OF CONTROLLING SAME AND CONTROL PROGRAM THEREFOR

(75) Inventor: Katsutoshi Izawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 974 days.

(21) Appl. No.: 11/808,464

(22) Filed: Jun. 11, 2007

(65) Prior Publication Data

US 2007/0291133 A1    Dec. 20, 2007

(30) Foreign Application Priority Data

Jun. 14, 2006    (JP) ................................. 2006-164233

(51) Int. Cl.
G06K 9/00    (2006.01)
(52) U.S. Cl. ......................................................... 382/118
(58) Field of Classification Search ................... 382/118
See application file for complete search history.

(56) References Cited

U.S. PATENT DOCUMENTS

| 4,072,973 | A | * | 2/1978 | Mayo ............................. 396/544 |
| 4,891,660 | A | * | 1/1990 | Biondo, Jr. .................... 396/283 |
| 7,003,139 | B2 | * | 2/2006 | Endrikhovski et al. ........ 382/118 |
| 2003/0108241 | A1 | * | 6/2003 | Colmenarez et al. .......... 382/181 |
| 2006/0158522 | A1 | * | 7/2006 | Pryor ......................... 348/207.99 |
| 2007/0201731 | A1 | * | 8/2007 | Fedorovskaya et al. ...... 382/118 |

FOREIGN PATENT DOCUMENTS

| JP | 11-46316 | 2/1999 |
| JP | 2002-107807 | 4/2002 |
| JP | 2004-157287 | 6/2004 |
| JP | 2004-266771 | 9/2004 |

* cited by examiner

Primary Examiner — Brian P Werner
(74) Attorney, Agent, or Firm — McGuinn IP Law Group, PLLC

(57) ABSTRACT

Output information such as a moving picture, still image or audio that will cause a person who is the subject of photography to laugh is stored in a digital still camera beforehand. If the output information is selected and a shutter-release button is pressed, the selected information is presented (as by being displayed or output from a speaker) to the person who is the subject. The subject is imaged and the image of the subject is obtained. Image data representing the image of the subject is recorded on a recording medium. The expression on the image of the subject is recognized and stored probabilities that output information will induce laughter are updated depending upon whether or not the subject is laughing. Output information having a high probability of inducing laughter can be presented to the subject.

7 Claims, 9 Drawing Sheets

*Fig. 1*
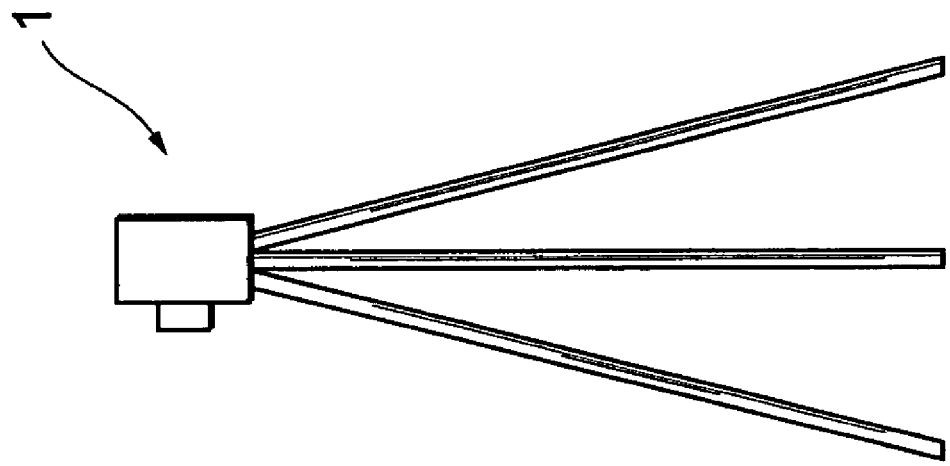
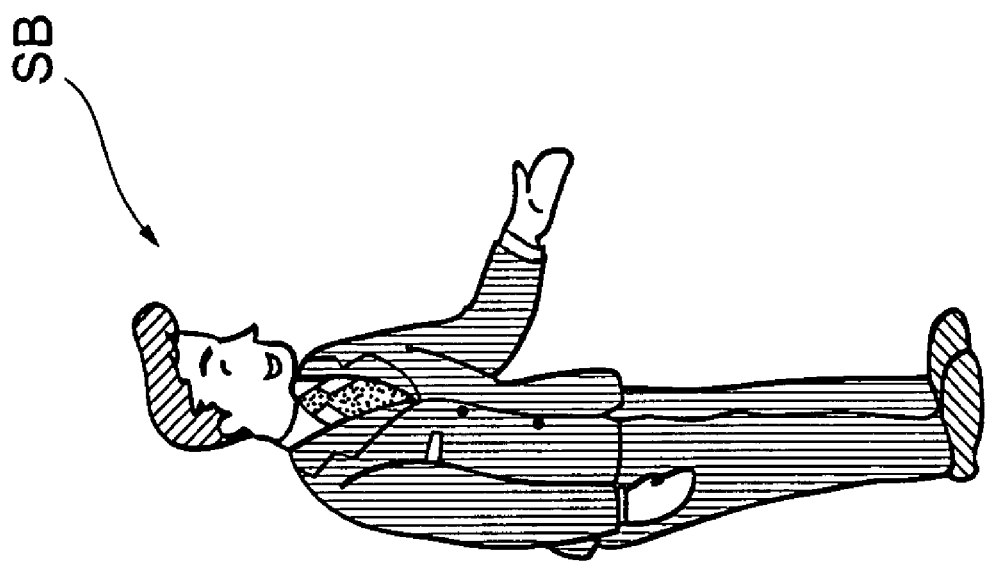

Fig. 3

OUTPUT INFORMATION TABLE

| OUTPUT INFORMATION | OUTPUT TYPE | PROBABILITY OF LAUGHTER(%) | | | OVERALL SCORE |
|---|---|---|---|---|---|
| | | LAUGHS A LOT | LAUGHS | DOSE NOT LAUGH | |
| TOKKYO TARO'S GAG 1 | AUDIO | 80 | 64 | 20 | 204 |
| JITSUYO SHINKO'S SHORT STORY 1 | MOVING PICTURE | 72 | 68 | 21 | 191 |
| ISHO JIRO'S SHORT STORY 1 | MOVING PICTURE | 70 | 69 | 20 | 189 |
| SHOHYO HANAKO'S COMIC DIALOGUE 1 | AUDIO | 60 | 64 | 23 | 171 |
| ⋮ | ⋮ | ⋮ | ⋮ | ⋮ | ⋮ |

Fig. 4

OUTPUT INFORMATION TABLE

| OUTPUT INFORMATION | OUTPUT TYPE | PROBABILITY OF LAUGHTER(%) | | | OVERALL SCORE |
|---|---|---|---|---|---|
| | | LAUGHS A LOT | LAUGHS | DOSE NOT LAUGH | |
| TOKKYO TARO'S GAG 1 | AUDIO | 80 | 64 | 20 | 204 |
| JITSUYO SHINKO'S SHORT STORY 1 | MOVING PICTURE | 75 | 68 | 21 | 197 |
| ISHO JIRO'S SHORT STORY 1 | MOVING PICTURE | 72 | 68 | 21 | 191 |
| SHOHYO HANAKO'S COMIC DIALOGUE 1 | AUDIO | 65 | 64 | 23 | 191 |
| ⋮ | ⋮ | ⋮ | ⋮ | ⋮ | ⋮ |

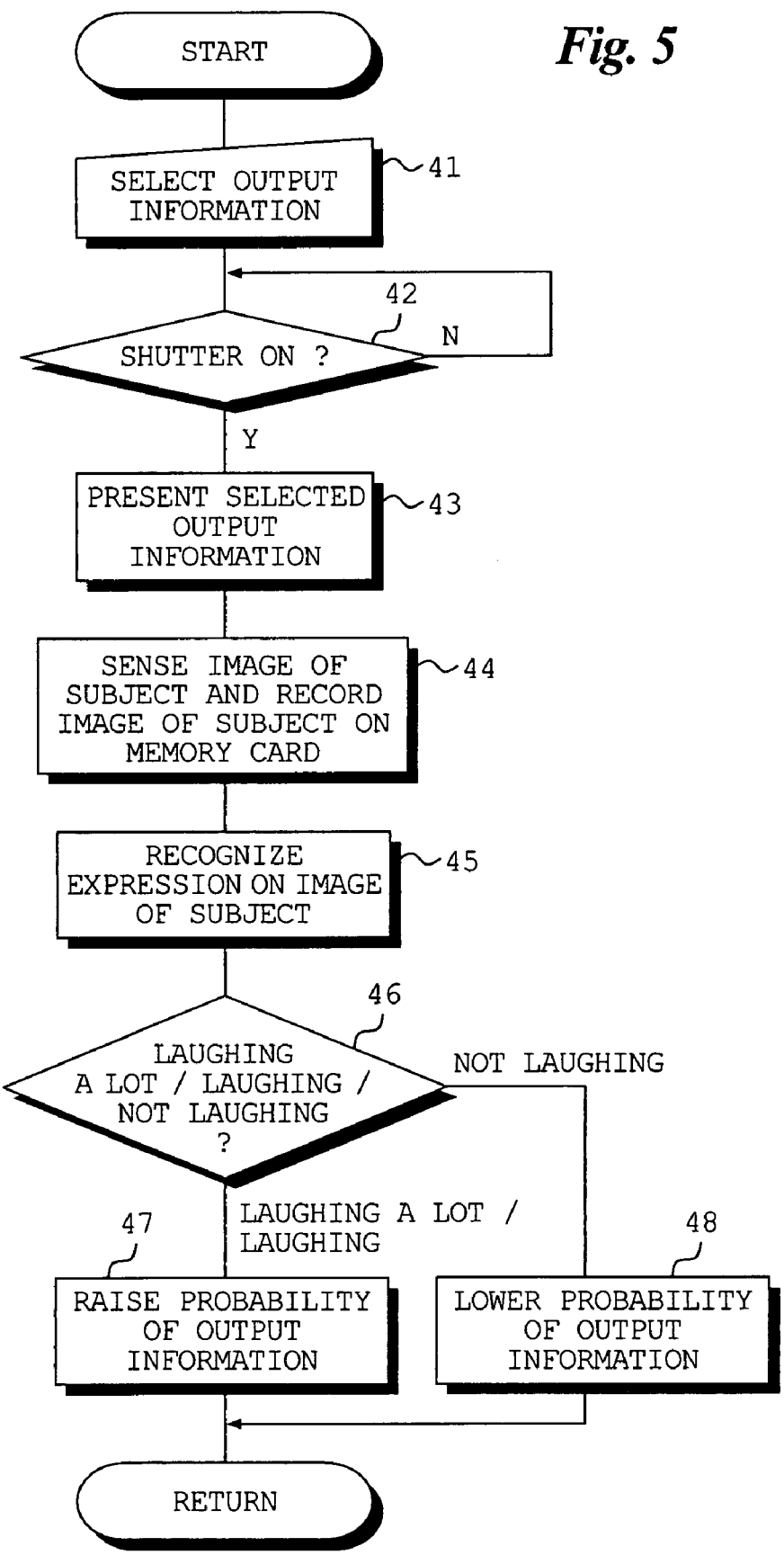

Fig. 6

OUTPUT INFORMATION TABLE

| SUBJET CATEGORY | OUTPUT INFORMATION | OUTPUT TYPE | PROBABILITY OF LAUGHTER(%) | | | OVERALL SCORE |
|---|---|---|---|---|---|---|
| | | | LAUGHS A LOT | LAUGHS | DOSE NOT LAUGH | |
| 001 (GENDER: MALE AGE BRACKET: 30 TO 40) | JITSUYO SHINKO'S SHORT STORY 1 | MOVING PICTURE | 85 | 64 | 20 | 214 |
| | JITSUYO SHINKO'S SHORT STORY 2 | MOVING PICTURE | 72 | 68 | 21 | 191 |
| | ISHO JIRO'S SHORT STORY 1 | MOVING PICTURE | 70 | 69 | 20 | 189 |
| | SHOHYO HANAKO'S COMIC DIALOGUE 1 | AUDIO | 65 | 64 | 23 | 171 |
| | ⋮ | ⋮ | ⋮ | ⋮ | ⋮ | ⋮ |
| 002 (GENDER: WOMAN AGE BRACKET: 20 TO 30) | TOKKYO TARO'S GAG 1 | AUDIO | 78 | 40 | 27 | 169 |
| | ISHO JIRO'S SHORT STORY 1 | MOVING PICTURE | 75 | 41 | 28 | 163 |
| | JYOYAKU ICHIRO'S SHORT STORY 1 | MOVING PICTURE | 70 | 39 | 30 | 149 |
| | KOUOTSU SABURO'S SHORT STORY 1 | MOVING PICTURE | 69 | 38 | 35 | 141 |
| | ⋮ | ⋮ | ⋮ | ⋮ | ⋮ | ⋮ |
| 003 | ⋮ | ⋮ | ⋮ | ⋮ | ⋮ | ⋮ |

PERSON IMAGING APPARATUS, METHOD OF CONTROLLING SAME AND CONTROL PROGRAM THEREFOR

BACKGROUND OF THE INVENTION

1. Field of the Invention

This invention relates to a person imaging apparatus, a method of controlling this apparatus and the related control program.

2. Description of the Related Art

Since a person who is the subject of commemorative photography or the like may become tense when being photographed, it may become fairly difficult for the person to smile. For this reason, there have been proposals in which a person is made to laugh or turn his or her gaze toward the camera as by showing the person a funny image or allowing the person to hear a funny voice (e.g., see the specifications of Japanese Patent Application Laid-Open Nos. 11-46316, 2002-107807, 2004-157287 and 2004-266771).

However, none of these proposals really give much thought to the laughing of a person. Further, even if a person can be made to laugh by some method, there is the possibility that the method will always be the same and become tiresome and lose its effectiveness.

SUMMARY OF THE INVENTION

Accordingly, an object of the present invention is to make possible the presentation of information that will generally induce much laughter in a person who is the subject of photography.

According to the present invention, the foregoing object is attained by providing a person imaging apparatus comprising: an information storage device for storing informational data, which represents a number of items of information such as moving pictures, still images and audio, in correspondence with probabilities that a person will be caused to laugh; an information presenting device for presenting one item of information, from among the number of items of informational data that have been stored in the information storage device, to a person who is the subject of photography; an image sensing device for sensing the image of a person and outputting image data representing the image of the person; a first imaging control device for controlling the image sensing device in such as manner that the image of the person is sensed in response to presentation of the information by the information presenting device; a laughing-face determination device for determining whether the image of the person represented by the image data that has been output from the image sensing device has a laughing face; and a first information updating device for updating probabilities that have been stored in the information storage device in such a manner that the probability corresponding to the information that has been presented by the information presenting device will be raised, updating being performed in response to a determination by the laughing-face determination device that the image of the person has a laughing face.

The present invention also provides a control method suited to the above-described person imaging apparatus. Specifically, the present invention provides a method of controlling a person image apparatus having an image sensing device for outputting image data representing the image of a person, the method comprising the steps of: storing informational data, which represents a number of items of information such as moving pictures, still images and audio, in an information storage device in correspondence with probabilities that a person will be caused to laugh; presenting, by an information presenting device, one item of information, from among the number of items of informational data that have been stored in the information storage device, to a person who is the subject of photography; controlling the image sensing device by a first imaging control device in such as manner that the image of the person is sensed in response to presentation of the information by the information presenting device; determining by a laughing-face determination device whether the image of the person represented by the image data that has been output from the image sensing device has a laughing face; and updating probabilities that have been stored in the information storage device in such a manner that the probability corresponding to the information that has been presented by the information presenting device will be raised, updating being performed by an information updating device in response to a determination by the laughing-face determination device that the image of the person has a laughing face.

The present invention also provides a program for implementing the above-described method of controlling a person imaging apparatus.

In accordance with the present invention, informational data representing a number of items of information such as moving pictures, still images and audio is stored in an information storage device in correspondence with probabilities that a person will be caused to laugh. A person who is the subject of photography is presented with one item of information from among the number of items of informational data that have been stored in the information storage device. When this is done, the image of the person is sensed and image data representing the image of the person is obtained. Whether the image of the person represented by the image data obtained is laughing is determined. If the person is laughing, probability that has been stored in the information storage device is updated so as to raise the probability that corresponds to the information presented. Since information for which there is a high probability that a person will laugh can be ascertained, the high-probability information can be presented to enable the imaging of a laughing person.

The apparatus may further comprise a second information updating device for updating probabilities that have been stored in the information storage device in such a manner that the probability corresponding to the information that has been presented by the information presenting device will be lowered, updating being performed in response to a determination by the laughing-face determination device that the image of the person does not have a laughing face.

The information storage device may store informational data by category of person. In this case, the apparatus would further comprise a second imaging control device for controlling the image sensing device so as to sense the image of a person; and a category deciding device for deciding in which category of the categories belongs the image of a person represented by image data that has been obtained by sensing the image of the person under control by the second imaging control device. Furthermore, the information presenting device would present the person who is the subject of photography with information represented by one item of informational data from among a number of items of informational data that have been stored in correspondence with categories decided by the category deciding device.

Further, the information presenting device may be so adapted that the higher the probability that a person will be made to laugh, the greater the ratio at which this information is presented.

The apparatus may further comprise an informational data receiving device for receiving informational data transmitted from an information server; and a storage control device for causing informational data received by the informational data receiving device to be stored in the information storage device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 illustrates the relationship between a subject and a digital still camera;

FIGS. 3 and 4 illustrate examples of output information tables;

FIG. 5 is a flowchart illustrating image sensing processing;

FIG. 6 illustrates an example of an output information table;

DESCRIPTION OF THE PREFERRED EMBODIMENTS

Preferred embodiments of the present invention will now be described in detail with reference to the drawings.

FIG. 1 illustrates the positional relationship between a digital still camera and a subject according to an embodiment of the present invention.

In this embodiment, a subject SB is assumed to be a person. A digital still camera 1 for sensing the image of the subject SB is placed in front of the subject SB, namely the person.

The digital still camera 1 is formed to have a display screen on its front side and is provided with a speaker. Moving pictures and still images, etc., for causing the subject SB to laugh can be displayed on the display screen. Audio for causing the subject SB to laugh also is output from the speaker. Since this output information such as moving pictures, still images and audio is presented to the subject SB, a laughing image of the subject is obtained even if the subject SB is tense.

Figure 2:
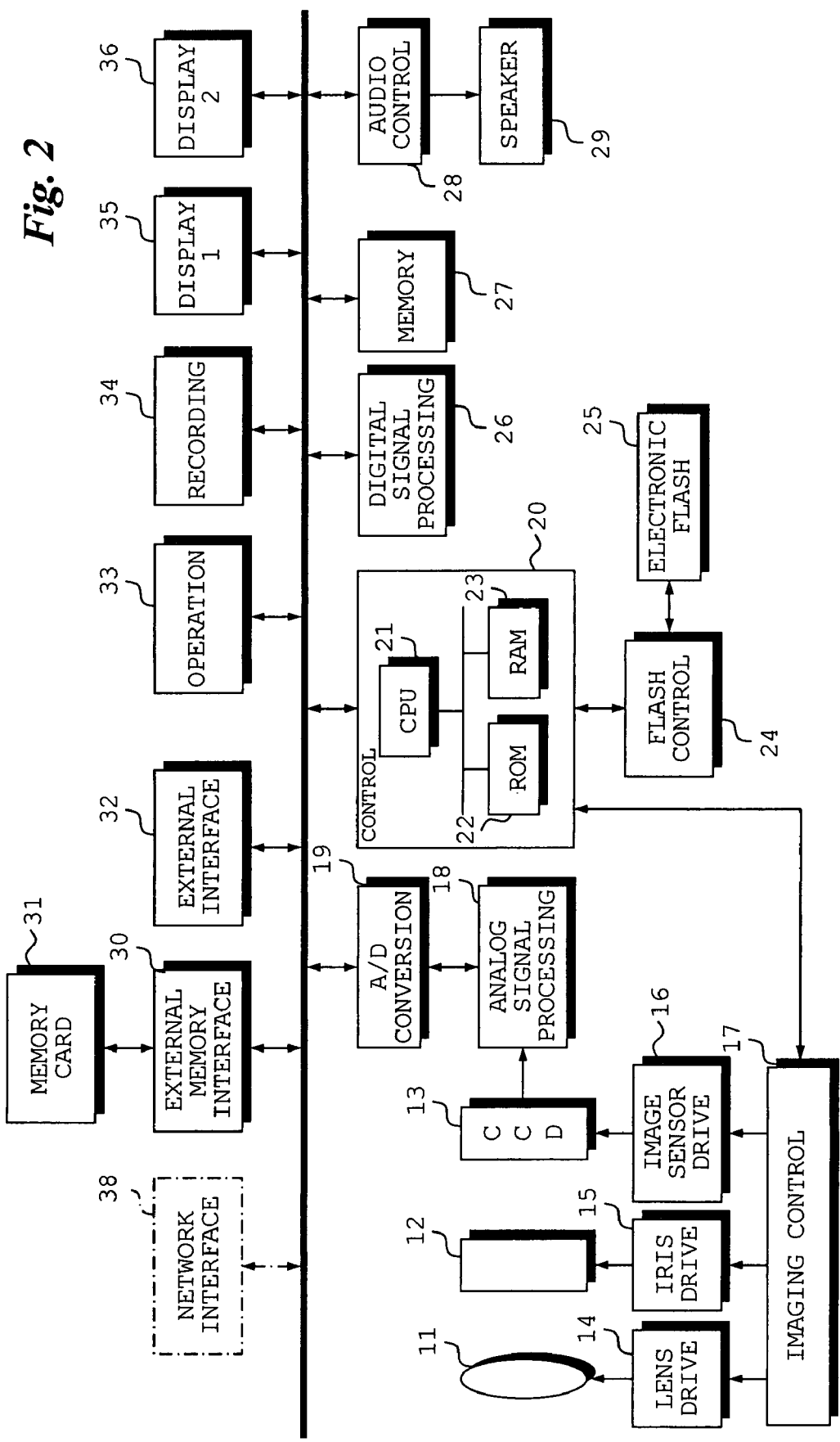
FIG. 2 is a block diagram illustrating the electrical structure of a digital still camera.

FIG. 2 is a block diagram illustrating the electrical structure of the digital still camera.

The operation of the overall digital still camera 1 is controlled by a control unit 20. The control unit 20 includes a CPU 21, a ROM 22 storing an operating program, etc., and a RAM 23 storing moving-picture data representing moving pictures, still-image data representing still images and audio data for outputting audio, as mentioned above.

The digital still camera 1 is provided with two display devices 35 and 36. One display device 35 is provided on the back side of the digital still camera 1 and displays the image of the subject obtained by imaging. The other display device 36 is formed on the front side of the camera, as mentioned above, and displays moving pictures and still images for making the subject SB laugh.

The digital still camera 1 is provided with an operating device 33 that includes a shutter-release button, a mode setting dial, a so-called cross-hair key formed to have up, down, left, right arrows that are capable of being pressed, and a decide button, etc. Operating signals from the operating device 33 are input to the control unit 20. In the digital still camera 1 according to this embodiment, flash photography is possible. A flash control circuit 24 is connected to the control unit 20 for this purpose. A light-emission from an electronic flash 25 is controlled by the flash control circuit 24.

An imaging lens 11 and an iris 12 are provided in front of a CCD 13. The imaging lens 11 is positioned by a lens driving circuit 14. The iris 12 is driven by an iris driving circuit 15. The CCD 13 is controlled by an image-sensor control circuit 16. The lens driving circuit 14, iris driving circuit 15 and image-sensor control circuit 16 are controlled by an imaging control circuit 17 that is controlled under control executed by the control unit 20.

If an image sensing mode is set, the CCD 13 outputs a video signal representing the image of the subject that has been formed on the photoreceptor surface of the CCD 13. The video signal is input to an analog signal processing circuit 18. The latter executes prescribed analog signal processing such as correlated double sampling and gain amplification. The video signal that is output from the analog signal processing circuit 18 is converted to digital image data by an analog/digital converting circuit 19.

By applying the digital image data to the display device 35, the image of the subject is displayed on the display screen of the display device 35.

If the shutter-release button is pressed, a moving picture or still image, etc., for causing the subject SB to laugh is displayed on the display screen of the other display device 36. Alternatively, audio for causing the subject SB to laugh is output from a speaker 29 under control executed by an audio control circuit 28. Owing to the output of the displayed images and audio, the image of the subject SB is sensed by the CCD 13 at a timing at which it is believed the subject SB will laugh, and digital image data representing the image of the subject is obtained in the manner described above. The digital image data is applied to and stored temporarily in a memory 27.

The image data is read out of the memory 27 and input to a digital signal processing circuit 26. The latter executes prescribed digital signal processing such as a gamma correction and white balance adjustment. The image data that has undergone this digital signal processing is applied to and recorded on a memory card 31 via an external memory interface 30 under control executed by a recording control circuit 34.

If the digital still camera 1 is set to a playback mode, image data that has been recorded on the memory card 31 can also be reproduced. However, playback has little relation to this embodiment and need not be described.

Further, the digital still camera 1 can be connected to an external device such as a personal computer. The digital still camera 1 is provided with an external interface 32 for this purpose. Furthermore, it may be so arranged that the digital still camera 1 is provided with a network interface 38 for connecting the camera directly to a network such as the Internet.

FIGS. 3 and 4 illustrate examples of output information tables that have been stored in the RAM 23.

The output information tables contain output information for causing a subject to laugh, namely "TOKKYO TARO'S GAG 1" and "JITSUYO SHINKO'S SHORT STORY 1", etc. The output information tables also contain the following in correspondence with the output information: output type indicating whether the output information is indicative of audio, a moving picture or still image; probability that the subject SB will laugh in a case where the corresponding output information has been presented to the subject SB; and overall score of probability that laughing will occur. Probabilities that laughing will occur include "LAUGHS A LOT" probability, "LAUGHS" probability and "DOES NOT LAUGH" probability. The items of output information are arranged in order of decreasing overall score. Overall score is calculated as follows: ("LAUGHS A LOT" probability)×2+ ("LAUGHS" probability)×1+("DOES NOT LAUGH" probability)×(−1).

In a case where output information has been presented and the image of the subject SB sensed, the expression on the image of the subject thus obtained by image sensing is analyzed as to whether the subject is laughing a lot, laughing or not laughing. The probability of laughter is updated in accordance with the result of this analysis.

FIG. 4 illustrates an example of an output information table.

In a case where the output information table is in the state illustrated in FIG. 3, assume that "ISHO JIRO'S SHORT STORY 1" has been selected as the output information and presented to the subject. Assume that by presenting this output information, the result of analysis is that the image of a subject laughing a lot has been obtained. In such case the output information table changes from that shown in FIG. 3 to that shown in FIG. 4, in which the "LAUGHS A LOT" probability and "LAUGHS" probability of "ISHO JIRO'S SHORT STORY 1" are both raised and the "DOES NOT LAUGH" probability is lowered. As a result, the third-ranked output information "ISHO JIRO'S SHORT STORY 1" becomes second-ranked output information. The output information "JITSUYO SHINKO'S SHORT STORY 1" that was ranked second becomes output information that is ranked third.

FIG. 5 is a flowchart illustrating processing executed when the digital still camera performs image sensing.

A list of items of output information is displayed on the display screen of the display device 36 provided on the back side of the digital still camera 1. Output information that is to be presented to the subject SB is selected from the displayed list of output information using the operating device 33 operated by the photographer who is operating the camera (step 41). Of course, it may be so arranged that output information is selected automatically without being selected by the photographer.

If the shutter-release button is pressed ("YES" at step 42), the selected output information is presented (step 43). If the selected output information is displayed in the manner of a moving picture or still image, then the output information is displayed on the display screen of the recording control circuit 34, which is provided on the front side of the camera. If the selected output information is audio, then the output information is output from the speaker 29.

The output information is presented and then the image of the subject SB is sensed at a fixed timing at which it is believed that the subject SB will laugh (step 44). Image data representing the image of the subject thus obtained by image sensing is recorded on a memory card, as described above. Further, the image data representing the image of the subject is applied also to the control unit 20, which proceeds to execute expression recognition to determine whether the image of the subject obtained by image sensing is laughing a lot, laughing or not laughing (step 45). Expression recognition can be quantified based upon degree of curvature of the mouth, degree of upturn of the corners of the mouth, size of the eyes, degree of wrinkling of the face, etc. By making a comparison with a threshold value on the basis of the quantified value, whether the image of the subject is laughing a lot, laughing or not laughing can be evaluated. Preferably, the image of the subject SB is sensed before the output information is presented, the image of the subject obtained is compared with the image of the subject obtained following presentation of the output information, and whether the image of the subject is laughing a lot, laughing or not laughing can then be determined based upon this comparison. This comparison raises the accuracy of the determination.

If the image of the subject is "laughing a lot" or "laughing" (step 46), then the output information table is updated so as to raise the probability of the output information in the manner described above (step 47). If the image of the subject is "not laughing" (step 46), then the output information table is updated so as to lower the probability of the output information (step 48).

FIGS. 6 to 9 illustrate another embodiment.

In this embodiment, output information is classified into categories of persons who will be the subjects of photography. Before image data representing the image of a subject obtained by image sensing (regular image sensing; first imaging control) is recorded on a memory card, the image of the subject is sensed (preview image sensing; second imaging control). The category of the subject is decided from the image of the subject obtained by preview image sensing. Output information contained in the category decided is presented to the subject and then the regular image sensing is performed. Output information that will induce laughter in the subject comparatively can be selected and presented.

FIG. 6 illustrates an example of an output information table.

Subject categories have been defined in the output information table in the manner described above. Output information has been stored in the output information table according to subject category. Examples of subject categories are a category (Category No. 001) covering males in the 30-to-40 age bracket, and a category (Category No. 002) covering females in the 20-to-30 age bracket. Although only two categories are illustrated in FIG. 6, it goes without saying that a greater number of categories can be defined.

Output information having a tendency to readily induce laughter in a subject is stored on a per-category basis. Further, the output information is stored in the output information table in order of decreasing overall score on a per-category basis.

Figure 7:
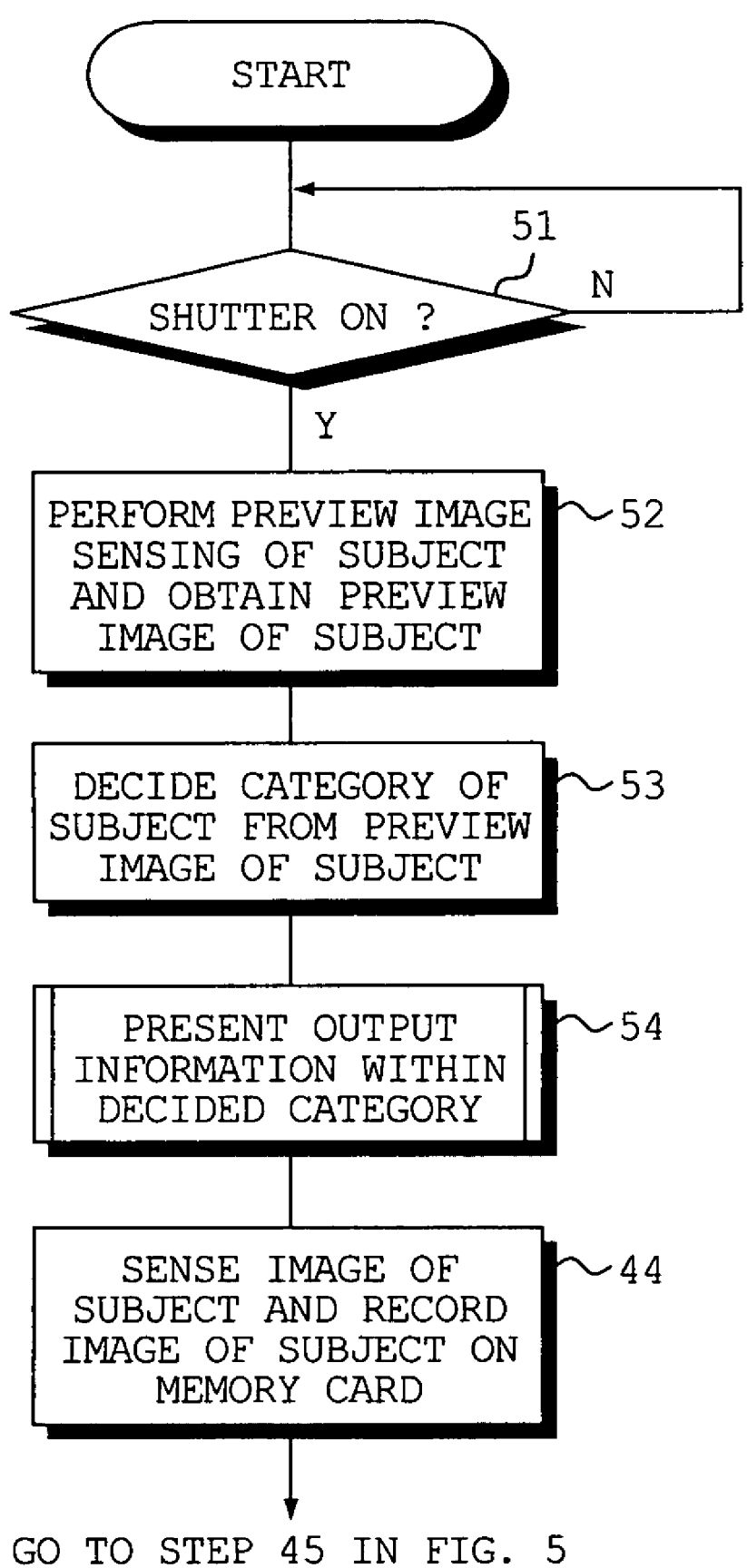
FIG. 7 is a flowchart illustrating a part of image sensing processing.

FIG. 7 is a flowchart illustrating a part of image sensing processing.

If the shutter-release button is pressed ("YES" at step 51), the subject is subjected to preview image sensing and a preview image of the subject is obtained (step 52). On the basis of the preview image of the subject obtained, whether the subject is male or female is discriminated and so is the age bracket of the subject. The category of the subject is decided in accordance with the result of discrimination (step 53). Gender can be discriminated based upon width of the shoulders, color of the lips, complexion of the face and length of the hair, etc. Age bracket can be discriminated based upon face wrinkles, shape of the eyes, complexion and color of the hair, etc. It goes without saying that preview image sensing may be performed before the shutter-release button is pressed.

When the category is decided, data representing one item of output information is read from among the number of items of output information that have been defined in the decided category. The output information represented by the read data is presented to the subject (step 54). The probabilities at which output information is presented may all be made identical or, as described later, may be made different. In any case, the output information decided is presented to the subject. This is followed by performing main image sensing of the subject and obtaining the image of the subject (step 44). This is similar to step 44 described earlier.

Figure 8:
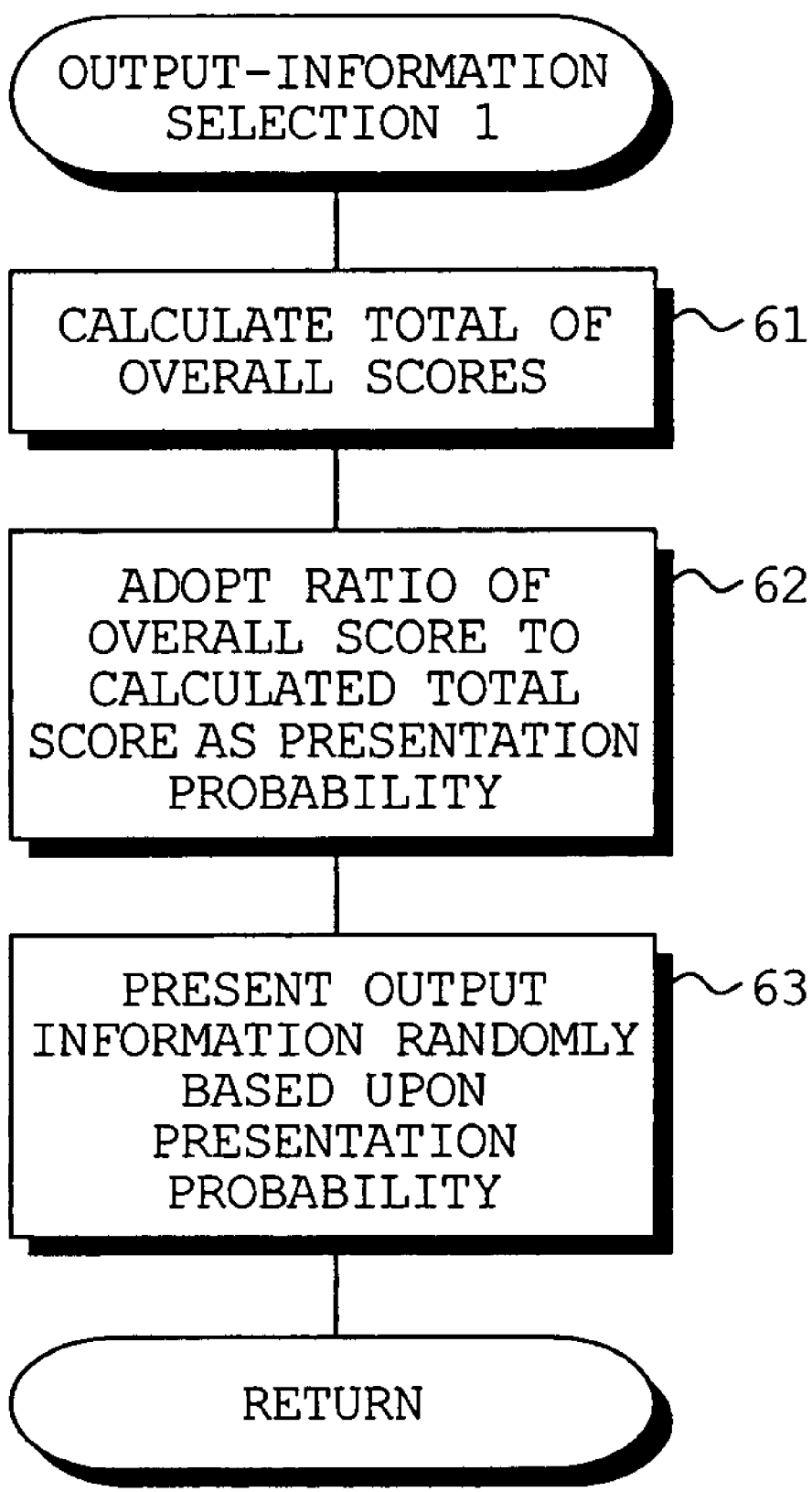
FIGS. 8 and 9 are flowcharts processing for selecting output information.

FIG. 8 is a flowchart illustrating processing for selecting the output information that is presented (the processing of step 54 in FIG. 7). Of course, it may be so arranged that the photographer makes the selection from the category in a manner similar to that described above.

A total score S of overall scores of output information that has been defined in the decided category is calculated (step 61). The ratio of an overall score to the total score S calculated is adopted as the presentation probability of each item of output information (step 62). For example, in the output information contained in the category of Category No. 001, the overall score of "JITSUYO SHINKO'S SHORT STORY 1" is 214, and therefore the presentation probability is 214/S. The overall score of "JITSUYO SHINKO'S SHORT STORY 2" is 191, and therefore the presentation probability is 191/S. The presentation probabilities regarding the other items of output information also are calculated in the same manner. Output information to be presented randomly is decided in such a manner that the higher the presentation probability calculated, the more readily the information is presented (step 63).

Figure 9:
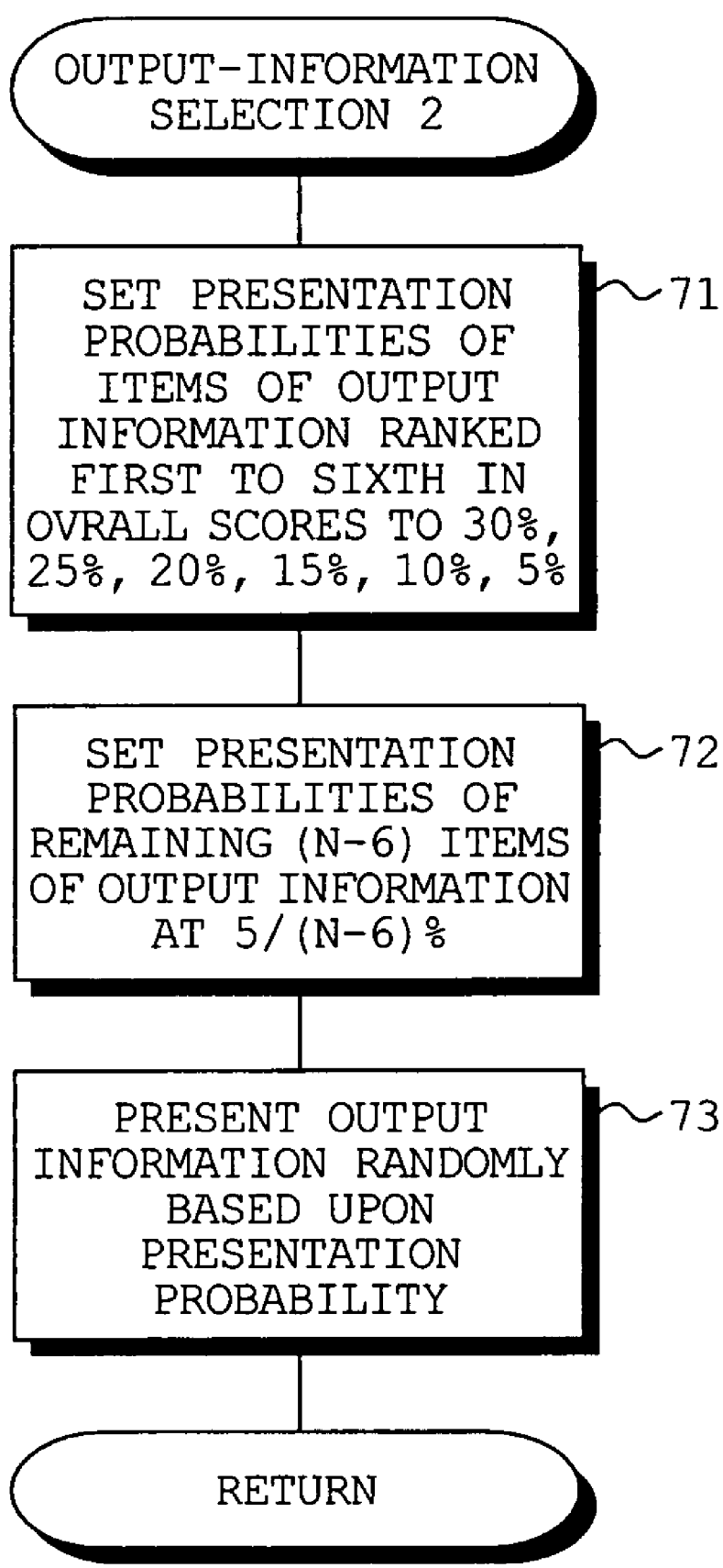

FIG. 9 is a flowchart illustrating another example of processing for selecting output information to be presented.

From output information that has been defined in a decided category, the presentation probabilities of items of output information from output information having the first highest (first ranking) overall score to output information having the sixth highest (sixth ranking) overall score are set at 30%, 25%, 20%, 15%, 10% and 5% in the order mentioned (step 71). The presentation probabilities of the remaining (N−6) items of output information (where N represents the total number of items of output information contained in this category) are each set at 5/(N−6)% (step 72). The output information presented is decided and presented to the subject based upon the set presentation probability (step 73).

In the embodiment described above, the presentation probabilities of the items of output information of the higher-ranked total scores are made different. However, the presentation probabilities of the items of output information whose overall scores are ranked first to fourth may be made 20% uniformly, and the presentation probabilities of the other items of output information may be made 20/(N−4)%, by way of example.

Figure 10:
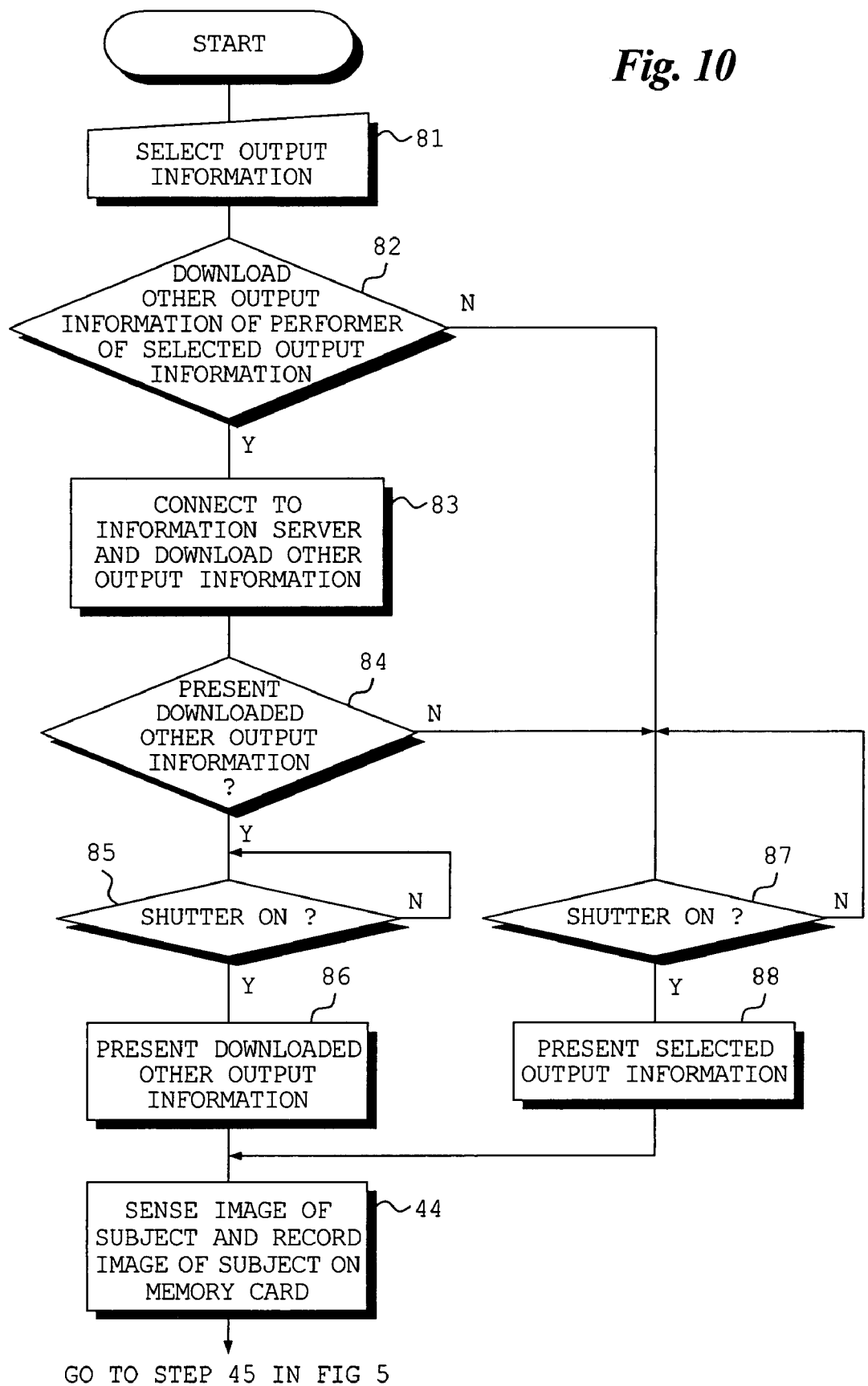
FIG. 10 is a flowchart illustrating a part of image sensing processing.

FIG. 10 is a flowchart illustrating image sensing processing according to a further embodiment.

This processing downloads output information from an information server and stores the information in the digital still camera. In this way output information can be kept new to prevent depletion of amusing material.

As described above, a list of output information is displayed on the digital still camera and output information is selected by the photographer (step 81). If other output information of a performer of the selected output information is downloaded ("YES" at step 82), the digital still camera is connected to an information server via a network. For example, text reading "DO YOU WISH TO UPDATE OUTPUT INFORMATION?YES/NO" is displayed on the display screen of the display device provided on the back side of the digital still camera and "YES" or "NO" is selected by the photographer.

The information server and digital still camera are connected and new (other) output information is downloaded to the digital still camera (step 83).

If output information that has been downloaded is presented ("YES" at step 84) and the shutter-release button is pressed ("YES" at step 85), then the downloaded other output information is presented to the subject (step 86). In a case where other output information is not downloaded ("NO" at step 82) or in a case where other output information has been downloaded but the downloaded other output information is not presented ("NO" at step 84), the selected output information is presented to the subject (step 88) if the shutter-release button is pressed ("YES" at step 87).

This is followed by performing image sensing of the subject and recording the image data representing the image of the subject on a recording medium. This is similar to step 44 described earlier.

The foregoing embodiment may be so adapted that the camera predicts whether depletion of amusing material is near and downloads output information automatically. Further, irrespective of whether the camera contains output information or not, it may be so arranged that output information can be selected and, if information that is not contained in the camera has been selected, this output information is downloaded from an information server. Furthermore, output information that could induce laughter because of a certain boom in the past and, conversely, output information that can induce laughter for reasons of nostalgia is conceivable. Accordingly, by way of example, it may be so arranged that output information is reset every year, or it may be so arranged that the output information table is updated by lowering the scores of output information with high scores and raising the scores of output information with low scores to thereby invert the order of scores.

Furthermore, although a display device and speaker for presenting output information are built in a digital still camera in the foregoing embodiments, it may be so arranged that these are not necessarily built in and externally provided units are controlled instead.

As many apparently widely different embodiments of the present invention can be made without departing from the spirit and scope thereof, it is to be understood that the invention is not limited to the specific embodiments thereof except as defined in the appended claims.

What is claimed is:

1. A person imaging apparatus comprising:
    an information storage device for storing informational data, which represents a number of items of information such as moving pictures, still images and audio, in correspondence with probabilities that a person will be caused to laugh;
    an information presenting device for presenting one item of information, from among the number of items of informational data that have been stored in said information storage device, to a person who is the subject of photography;
    an image sensing device for sensing the image of a person and outputting image data representing the image of the person;
    a first imaging control device for controlling said image sensing device in such a manner that the image of the person is sensed in response to presentation of the information by said information presenting device;
    a laughing-face determination device for determining whether the image of the person represented by the image data that has been output from the image sensing device has a laughing face; and
    a first information updating device for updating probabilities that have been stored in said information storage device in such a manner that the probability corresponding to the information that has been presented by said information presenting device will be raised, updating being performed in response to a determination by said laughing-face determination device that the image of the person has a laughing face.

2. The apparatus according to claim 1, further comprising a second information updating device for updating probabilities that have been stored in said information storage device in such a manner that the probability corresponding to the information that has been presented by said information presenting device will be lowered, updating being performed in response to a determination by said laughing-face determination device that the image of the person does not have a laughing face.

3. The apparatus according to claim 1, wherein said information storage device stores informational data by category of person, and said apparatus further comprises:
   a second imaging control device for controlling said image sensing device so as to sense the image of a person; and
   a category deciding device for deciding in which category of the categories belongs the image of a person represented by image data that has been obtained by sensing the image of the person under control performed by said second imaging control device;
   said information presenting device presenting the person who is the subject of photography with information represented by one item of informational data from among a number of items of informational data that have been stored in correspondence with categories decided by said category deciding device.

4. The apparatus according to claim 1, wherein said information presenting device is so adapted that the higher the probability that a person will be made to laugh, the greater the ratio at which this information is presented.

5. The apparatus according to claim 1, further comprising:
   an informational data receiving device for receiving informational data transmitted from an information server; and
   a storage control device for causing informational data received by said informational data receiving device to be stored in said information storage device.

6. A method of controlling a person image apparatus having an image sensing device for outputting image data representing the image of a person, the method comprising:
   storing informational data, which represents a number of items of information such as moving pictures, still images and audio, in an information storage device in correspondence with probabilities that a person will be caused to laugh;
   presenting, by an information presenting device, one item of information, from among the number of items of informational data that have been stored in the information storage device, to a person who is the subject of photography;
   controlling the image sensing device by a first imaging control device in such a manner that the image of the person is sensed in response to presentation of the information by the information presenting device;
   determining by a laughing-face determination device whether the image of the person represented by the image data that has been output from the image sensing device has a laughing face; and
   updating probabilities that have been stored in the information storage device in such a manner that the probability corresponding to the information that has been presented by the information presenting device will be raised, updating being performed by an information updating device in response to a determination by the laughing-face determination device that the image of the person has a laughing face.

7. A non-transitory computer readable medium including a program for controlling a person imaging apparatus having an image sensing device for outputting image data representing the image of a person, the program comprising:
   storing informational data, which represents a number of items of information such as moving pictures, still images and audio, in an information storage device in correspondence with probabilities that a person will be caused to laugh;
   presenting one item of information, from among the number of items of informational data that have been stored in the information storage device, to a person who is the subject of photography;
   controlling the image sensing device in such a manner that the image of the person is sensed in response to presentation of the information;
   determining whether the image of the person represented by the image data that has been output from the image sensing device has a laughing face; and
   updating probabilities that have been stored in the information storage device in such a manner that the probability corresponding to the information that has been presented will be raised, updating being performed in response to a determination that the image of the person has a laughing face.

* * * * *